US009865228B2

(12) United States Patent
Shigemasa et al.

(10) Patent No.: US 9,865,228 B2
(45) Date of Patent: Jan. 9, 2018

(54) COMPUTER PROGRAM PRODUCT, INFORMATION PROCESSING METHOD, AND INFORMATION PROCESSING APPARATUS

(71) Applicants: Tsuyoshi Shigemasa, Tokyo (JP); Masanori Ishigami, Tokyo (JP); Mikiko Abe, Tokyo (JP); Masahiro Ujiie, Tokyo (JP); Taro Okuyama, Tokyo (JP); Yoshinaga Kato, Kanagawa (JP)

(72) Inventors: Tsuyoshi Shigemasa, Tokyo (JP); Masanori Ishigami, Tokyo (JP); Mikiko Abe, Tokyo (JP); Masahiro Ujiie, Tokyo (JP); Taro Okuyama, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 17 days.

(21) Appl. No.: 14/217,934

(22) Filed: Mar. 18, 2014

(65) Prior Publication Data

US 2014/0292816 A1 Oct. 2, 2014

(30) Foreign Application Priority Data

Mar. 26, 2013 (JP) ................................. 2013-064927

(51) Int. Cl.
*G09G 5/12* (2006.01)
*G06F 3/14* (2006.01)
*G09G 5/373* (2006.01)

(52) U.S. Cl.
CPC ............. *G09G 5/12* (2013.01); *G06F 3/1423* (2013.01); *G06F 3/1431* (2013.01);
(Continued)

(58) Field of Classification Search
None
See application file for complete search history.

(56) References Cited

U.S. PATENT DOCUMENTS

| 5,953,075 A | 9/1999 | Nagata et al. |
| 6,151,079 A | 11/2000 | Nagata et al. |

(Continued)

FOREIGN PATENT DOCUMENTS

| CN | 101408868 A | 4/2009 |
| JP | 06-102975 | 4/1994 |

(Continued)

OTHER PUBLICATIONS

The Extended European Search Report dated Aug. 1, 2014, in Application No. / Patent No. 14158694.1-1904.

(Continued)

*Primary Examiner* — Duane N Taylor, Jr.
(74) *Attorney, Agent, or Firm* — Oblon, McClelland, Maier & Neustadt, L.L.P.

(57) ABSTRACT

A computer program product includes a non-transitory computer-usable medium having computer-readable program codes embodied in the medium. The program codes when executed cause a computer to execute: detecting a connection status of an externally connected second display different from a built-in first display; writing status information indicating the detected connection status in a storage, changing over a display destination between the first display and the second display based on the detected connection status, and controlling a display screen according to screen specifications of the first display or the second display, which corresponds to the display destination after changeover; and reading the connection status written in the storage and scaling a display image at a magnification based on the read connection status.

17 Claims, 7 Drawing Sheets

(52) U.S. Cl.
CPC ........... *G06F 3/1454* (2013.01); *G09G 5/373* (2013.01); *G09G 2370/042* (2013.01); *G09G 2370/047* (2013.01); *G09G 2370/22* (2013.01)

(56) References Cited

U.S. PATENT DOCUMENTS

| | | | |
|---|---|---|---|
| 8,013,805 B2 * | 9/2011 | Piazza | G06F 3/1454 345/1.1 |
| 2004/0212610 A1 * | 10/2004 | Hamlin | G06F 3/1423 345/211 |
| 2009/0165059 A1 * | 6/2009 | Seki | G06F 3/0219 725/80 |
| 2010/0164839 A1 * | 7/2010 | Lyons et al. | 345/2.3 |
| 2012/0050183 A1 | 3/2012 | Lee | |
| 2012/0050314 A1 | 3/2012 | Wang | |
| 2012/0287058 A1 | 11/2012 | Lee | |
| 2012/0299846 A1 | 11/2012 | Matsuda | |
| 2014/0125554 A1 * | 5/2014 | Pan et al. | 345/2.2 |

FOREIGN PATENT DOCUMENTS

| | | |
|---|---|---|
| JP | 10-042204 | 2/1998 |
| JP | 11-088761 | 3/1999 |
| JP | 2001-024976 | 1/2001 |
| JP | 2002-259132 A | 9/2002 |
| JP | 2006-323179 A | 11/2006 |
| JP | 2012-237964 | 12/2012 |

OTHER PUBLICATIONS

Office Action dated Jul. 25, 2016, in Chinese Patent Application No. 201410113914.9 (with English language translation).
Japanese Office Action dated Nov. 22, 2016 in Patent Application No. 2013-064927.

* cited by examiner

COMPUTER PROGRAM PRODUCT, INFORMATION PROCESSING METHOD, AND INFORMATION PROCESSING APPARATUS

CROSS-REFERENCE TO RELATED APPLICATIONS

The present application claims priority to and incorporates by reference the entire contents of Japanese Patent Application No. 2013-064927 filed in Japan on Mar. 26, 2013.

BACKGROUND OF THE INVENTION

1. Field of the Invention

The present invention relates to a computer program product, an information processing method, and an information processing apparatus.

2. Description of the Related Art

Japanese Patent Application Laid-open No. 2001-24976, for example, discloses a technique that, when an external display device is connected to an image processing apparatus having a display device, changes a display destination from the display device of the image processing apparatus to the external display device.

Unfortunately, however, the related-art technique at times fails to properly perform changeover (changeover of the display destination) between the built-in display device (hereinafter referred to as an "internal display") and the external display device (hereinafter referred to as an "external display").

The changeover between the internal display and the external display is achieved, for example, through execution of application software that provides a display control function. The display control function in this case includes a function of detecting connection of the external display and a function of generating, based on the detection result, a display screen (user interface, or UI) corresponding to the display destination. These sub-functions are implemented in the form of, for example, different modules (software components) such as a detection module and a UI module, and the UI module receives a detection event from the detection module and generates the UI for the new display destination. Thus, if, for example, the UI module has a starting time longer than a starting time of the detection module, the UI module is unable to receive the detection event from the detection module. As such, with the related-art technique, the display destination may not be properly changed over during starting of the display control function.

In view of the foregoing, there is a need to provide a computer program product, an information processing method, and an information processing apparatus that can properly change over the display destination even during starting of the display control function.

SUMMARY OF THE INVENTION

It is an object of the present invention to at least partially solve the problems in the conventional technology.

A computer program product includes a non-transitory computer-usable medium having computer-readable program codes embodied in the medium. The program codes when executed cause a computer to execute: detecting a connection status of an externally connected second display different from a built-in first display; writing status information indicating the detected connection status in a storage, changing over a display destination between the first display and the second display based on the detected connection status, and controlling a display screen according to screen specifications of the first display or the second display, which corresponds to the display destination after changeover; and reading the connection status written in the storage and scaling a display image at a magnification based on the read connection status.

An information processing method includes: detecting a connection status of an externally connected second display different from a built-in first display; writing status information indicating the detected connection status in a storage, changing over a display destination between the first display and the second display based on the detected connection status, and controlling a display screen according to screen specifications of the first display or the second display, which corresponds to the display destination after changeover; and reading the connection status written in the storage and scaling a display image at a magnification based on the read connection status.

An information processing apparatus includes: a detection unit that detects a connection status of an externally connected second display different from a built-in first display; a control unit that writes status information indicating the detected connection status in a storage, changes over a display destination between the first display and the second display based on the detected connection status, and controls a display screen according to screen specifications of the first display or the second display, which corresponds to the display destination after the changeover; and a scaling unit that reads the connection status written in the storage and scales a display image at a magnification based on the read connection status.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An information processing program, an information processing method, and an information processing apparatus according to an embodiment of the present invention will be described in detail below with reference to the accompanying drawings.

First Embodiment

System Configuration

Figure 1:
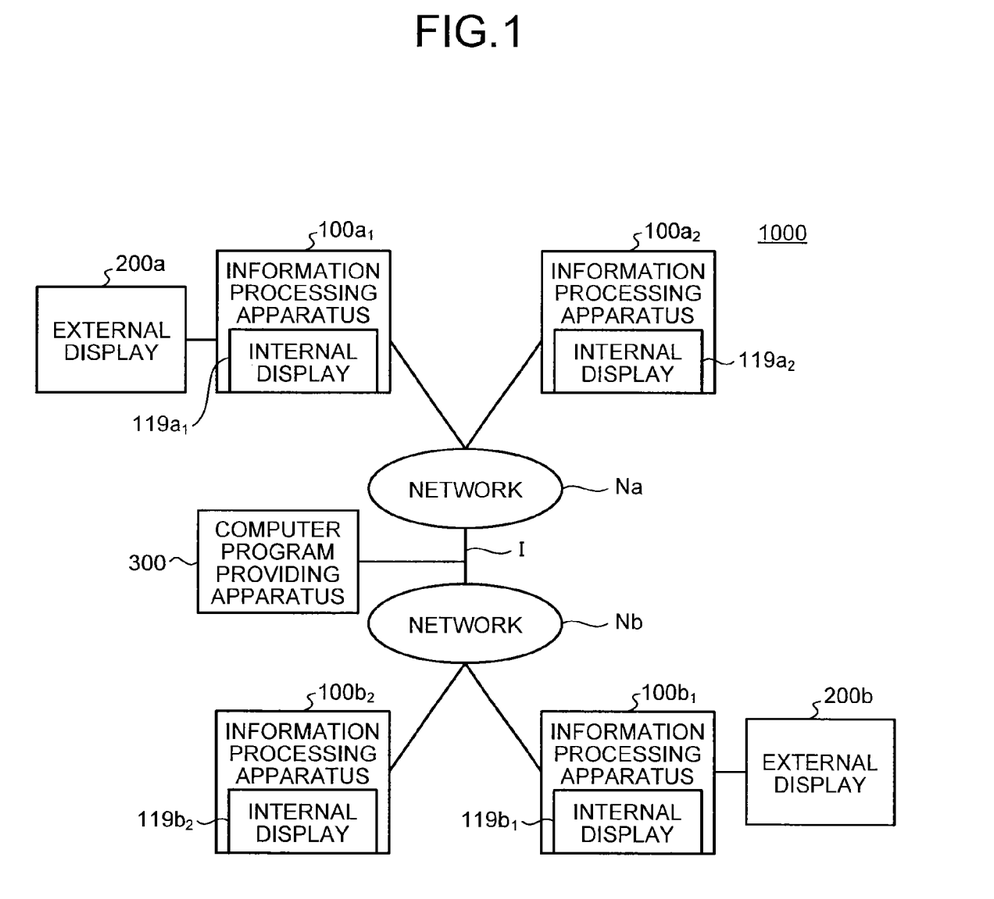
FIG. 1 is a diagram illustrating an exemplary configuration of an information processing system according to a first embodiment.

FIG. 1 is a diagram illustrating an exemplary configuration of an information processing system 1000 according to a first embodiment. FIG. 1 illustrates an exemplary conference system using a plurality of information processing apparatuses $100a_1$, $100a_2$, $100b_1$, $100b_2$. The information processing apparatuses $100a_1$, $100a_2$ are connected to an internal network Na and the information processing apparatuses $100b_1$, $100b_2$ are connected to an internal network Nb. The networks Na, Nb (to be collectively called a "network N") each correspond to, for example, a local area network (LAN). Additionally, the network N is connected to an external network I. The external network I corresponds to, for example, a wide area network (WAN) or the Internet. Thus, in the information processing system 1000 according to the embodiment, the information processing apparatuses $100a_1$, $100a_2$ and the information processing apparatuses $100b_1$, $100b_2$ can perform data communication via the external network I. Additionally, the information processing system 1000 according to the embodiment includes a computer program providing apparatus 300 connected to the external network I. The computer program providing apparatus 300, for example, provides the information processing apparatuses $100a_1$, $100a_2$, $100b_1$, $100b_2$ with computer programs over the external network I.

As illustrated in FIG. 1, the information processing apparatuses $100a_1$, $100a_2$, $100b_1$, $100b_2$ include internal displays $119a_1$, $119a_2$, $119b_1$, $119b_2$, respectively. The information processing apparatuses $100a_1$, $100a_2$, $100/b_1$, $100b_2$ will hereinafter be collectively called an "information processing apparatus 100". The internal displays $119a_1$, $119a_2$, $119b_1$, $119b_2$ will hereinafter be collectively called an "internal display 119".

The information processing apparatuses $100a_1$, $100b_1$ further include external displays 200a, 200b having screen specifications (e.g., "display area size" and "resolution") different from those of the internal displays $119a_1$, $119b_1$, respectively. The external displays 200a, 200b will hereinafter be collectively called an "external display 200".

The information processing apparatus 100 according to the embodiment has a display control function, performing display control to change over a display destination between the internal display 119 and the external display 200. The information processing apparatus 100 corresponds, for example, to a personal computer (PC), a conference-dedicated terminal, a smartphone, a tablet terminal, a portable telephone, or a projector. The internal display 119 and the external display 200 are display devices that display various types of images, such as a moving image and a still image. With the projector, a screen or other projecting plane on which a projected image is displayed corresponds to the internal display 119.

The information processing system 1000 according to the embodiment, having the system configuration as described above, can provide the following conference service. For example, the information processing system 1000 uses the information processing apparatus $100a_1$ connected to the network Na to make a connection request (a conference attendance request) to the information processing apparatus $100a_2$ connected to the same network Na. Additionally, the information processing system 1000 uses the information processing apparatus $100a_1$ connected to the network Na to make a connection request (a conference attendance request) via the external network I to the information processing apparatuses $100b_1$, $100b_2$ connected to the network Nb. When the information processing apparatuses $100a_2$, $100b_1$, $100b_2$ then respond to the connection requests (conference attendance requests), two-way data communication is established between the information processing apparatus $100a_1$ and each of the information processing apparatuses $100a_2$, $100b_1$, $100b_2$. Through such call control, the information processing system 1000 starts providing conference service using two-way communication using various types of content, such as text, images (including still images and moving images), and audio. At this time, the internal display 119 of the information processing apparatus 100 displays image content including images of conference attendees and conference material. If the external display 200 is connected to the information processing apparatus 100 at this time, the display destination is changed over from the internal display 119 to the external display 200 to display the image content on the external display 200.

Possible systems of the above call control include (1) a session initiation protocol (SIP) and (2) H.323. In addition, the possible call control systems include (3) a SIP-extended protocol and (4) an instant messenger protocol. The possible call control systems may further include (5) a protocol utilizing a SIP message method and (6) an Internet relay chat (IRC) protocol. The possible call control systems may still include (7) an instant messenger protocol-extended protocol. Of the protocols cited above, (4) the instant messenger protocol is used in, for example, (4-1) extensible messaging and presence protocol (XMPP) and (4-2) ICQ (registered trademark). In addition, (4) the instant messenger protocol is used in, for example, AIM (registered trademark) and Skype (registered trademark). (7) The instant messenger protocol-extended protocol is, for example, Jingle.

As an image encoding system, H.264/AVC or H.264/SVC, for example, may be used. Still, any other encoding system may be used.

In addition, the call control between the different information processing apparatuses 100 may be performed via, for example, a call control server. Data communication among the different information processing apparatuses 100 may be performed via a repeater that relays various types of content.

Hardware Configuration

Figure 2:
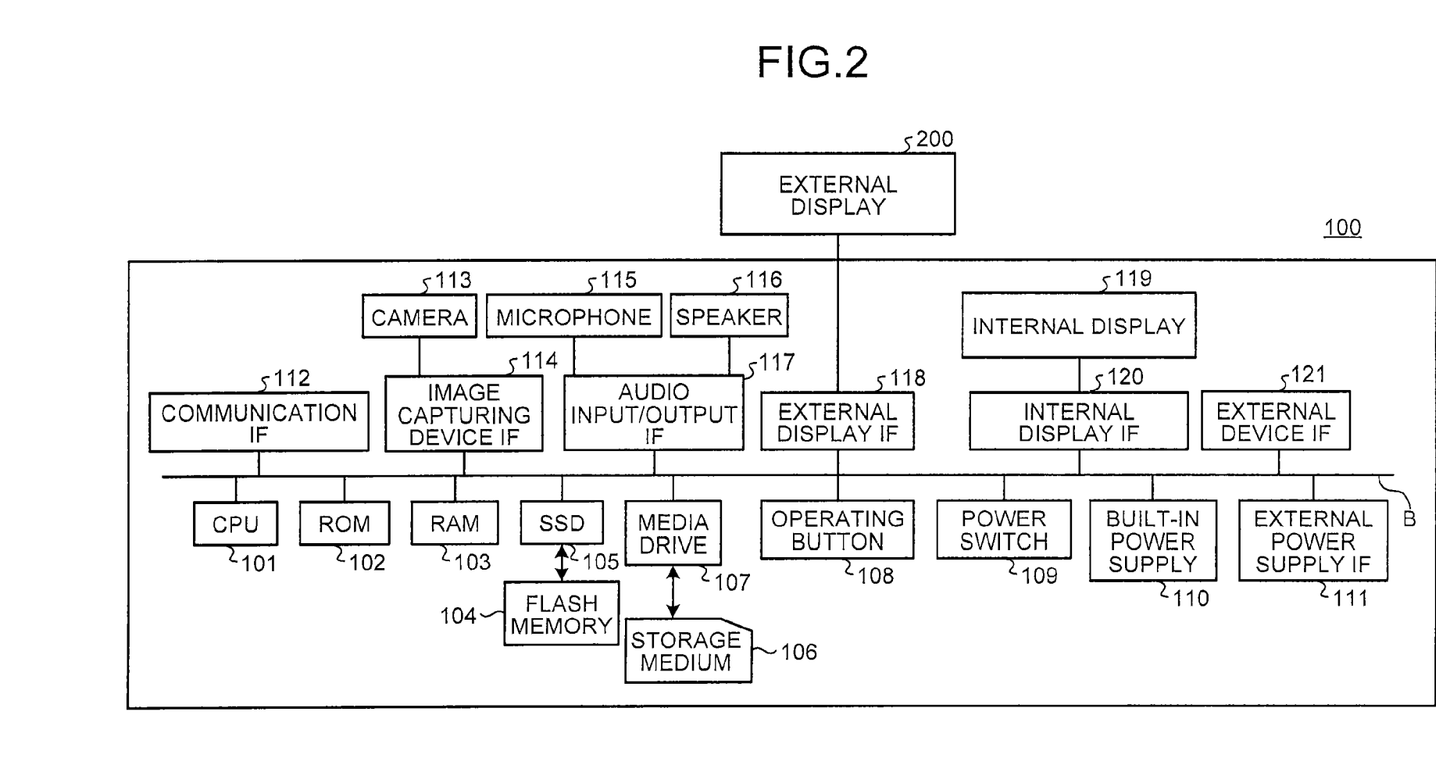
FIG. 2 is a diagram illustrating an exemplary hardware configuration of an information processing apparatus according to the first embodiment.

FIG. 2 is a diagram illustrating an exemplary hardware configuration of the information processing apparatus 100 according to the embodiment. As illustrated in FIG. 2, the information processing apparatus 100 according to the embodiment includes, for example, a central processing unit (CPU) 101. The information processing apparatus 100 further includes a read only memory (ROM) 102 and a random access memory (RAM) 103. The information processing apparatus 100 further includes a flash memory 104, a solid state drive (SSD) 105, and a media drive 107. The information processing apparatus 100 further includes an operating button 108, a power switch 109, a built-in power supply 110, and an external power supply IF 111. The information processing apparatus 100 further includes a communication IF 112, a camera 113, an image capturing device IF 114, a microphone 115, a speaker 116, and an audio input/output IF 117. The information processing apparatus 100 further includes an external display IF 118, the internal display 119, an internal display IF 120, and an external device IF 121. In the information processing apparatus 100, the foregoing components are connected to each other by a bus B.

The CPU 101 is an arithmetic unit that controls the whole of the information processing apparatus 100. The ROM 102 is a nonvolatile semiconductor memory that can retain internal data even with power turned off. The ROM 102 stores therein, for example, computer programs executed upon the start of the information processing apparatus 100, and data. The RAM 103 is a volatile semiconductor memory. The CPU 101 loads, for example, a computer program or data from the ROM 102 on the RAM 103 and performs processing, thereby achieving control of the whole of the information processing apparatus 100 and functions implemented thereon.

The flash memory 104 is a nonvolatile semiconductor memory, such as, for example, a flash electrically erasable programmable ROM (EEPROM) and a flash ROM. The SSD 105 reads data from, and writes data to, the flash memory 104. The media drive 107 reads data from, and writes data to, a storage medium 106. Non-limiting examples of the storage medium 106 include a flexible disk, a compact disc (CD), a digital versatile disc (DVD), a memory card.

The operating button 108 is a user interface (UI) used for inputting operating signals to the information processing apparatus 100. The power switch 109 turns on or off supply of electric power to the information processing apparatus 100. The built-in power supply 110 supplies driving electric power from the inside of the information processing apparatus 100, not from the outside. The built-in power supply 110 may, for example, be a storage battery such as a battery. The external power supply IF 111 serves as an interface between a power supply that supplies the information processing apparatus 100 with driving electric power from the outside and the information processing apparatus 100. With an external power supply from an outlet, for example, a plug corresponds to the external power supply IF 111.

The communication IF 112 is an interface that connects the information processing apparatus 100 to a predetermined data transmission path, such as the network N. The camera 113 includes an optical system engine, such as a lens and captures an image by receiving incident light with an image capturing device. The image capturing device IF 114 serves as an interface that performs data transfer between each of various types of optical system devices, such as the camera 113, and the information processing apparatus 100. The microphone 115 detects sound using, for example, a sensor. The speaker 116, for example, reproduces detected sound data or predetermined audio content to thereby output sound. The audio input/output IF 117 serves as an interface that performs data transfer between each of various types of audio input/output devices, such as the microphone 115 and the speaker 116, and the information processing apparatus 100.

The external display IF 118 and the internal display IF 120 serve as interfaces that perform data transfer between the external display 200 and the internal display 119, respectively, and the information processing apparatus 100. The external display 200 and the internal display 119 may, for example, be a liquid crystal display that displays a result of processing performed by the information processing apparatus 100. The external device IF 121 serves as an interface that performs data transfer between each of various types of external devices, such as a PC, a smartphone, a tablet terminal, and a portable telephone, and the information processing apparatus 100. The external device IF 121 may be connected with, for example, an external storage device such as a hard disk drive (HDD) and a microdrive.

As described above, the information processing system 1000 according to the embodiment can provide, through the above-described configuration, conference service using two-way communication using various types of content between remote sites (for example, "between different networks").

Display Control Function

The display control function according to the embodiment will be described. The information processing apparatus 100 according to the embodiment detects a connection status of the external display 200. Based on the detected connection status, the information processing apparatus 100 changes over the display destination between the internal display 119 (a first display) and the external display 200 (a second display) and controls the display screen according to the screen specifications of the display corresponding to the display destination after the changeover. At this time, in the information processing apparatus 100, a detection module stores in memory the detected connection status of the external display 200 and notifies a UI module that writing (storing in memory) has been completed. When the UI module receives the notification of the completion of writing, the information processing apparatus 100 acquires the connection status of the external display 200 stored in memory and, based on the acquired information, performs scaling and setting of resolution of the display image corresponding to the external display 200. The information processing apparatus 100 according to the embodiment has such a display control function.

The related-art technique may fail to properly perform changeover between the internal display 119 and the external display 200 at the start of the display control function. The display control function, if achieved through execution of application software, includes the detection module that detects the connection of the external display 200 and the UI module that generates the display screen corresponding to the display destination based on the detection result.

The information processing apparatus 100 having the display control function may encounter the following use situation. Specifically, for example, the external display 200 is connected to the information processing apparatus 100 in advance before the information processing apparatus 100 is turned on. When the information processing apparatus 100 is turned on under the foregoing condition, the detection module and the UI module are started. This causes the detection module to detect the connection of the external display 200 and to notify the UI module of the detection event. If the UI module is yet to complete starting at this time, the UI module is unable to receive the notified detection event. Specifically, the UI module fails to receive the detection event notified during its starting during which the UI module is unable to receive events. As a result, the information processing apparatus 100 is unable to generate the display screen corresponding to the external display 200 to which the changeover is to be performed, and unable to change over the display destination to the external display 200. As such, the related-art technique may fail to properly change over the display destination during the starting of the display control function.

The display control function to change over the display destination is utilized, for example, in conference service as described with reference to FIG. 1. In conference service use situations, the external display 200 having a larger screen than that of the internal display 119 is very often used to ensure smooth communication during the conference. Also from this viewpoint, it is preferable that the display control function can properly change over the display destination based on the result of detection of the external display 200, regardless of the order in which the modules complete starting.

Thus, the display control function according to the embodiment has a system of controlling the changeover of the display screen corresponding to the display destination, in which the connection status of the detected external display 200 is stored, the stored connection status is determined according to the notification of the completion of storage, and the display screen is changed based on the result of the determination.

This allows the display control function according to the embodiment to provide an environment in which the display destination is changed over properly based on the result of detection of the external display 200, regardless of the order in which the modules complete starting. As a result, the display control function according to the embodiment can appropriately change over the display destination even during starting of the display control function.

Figure 3:
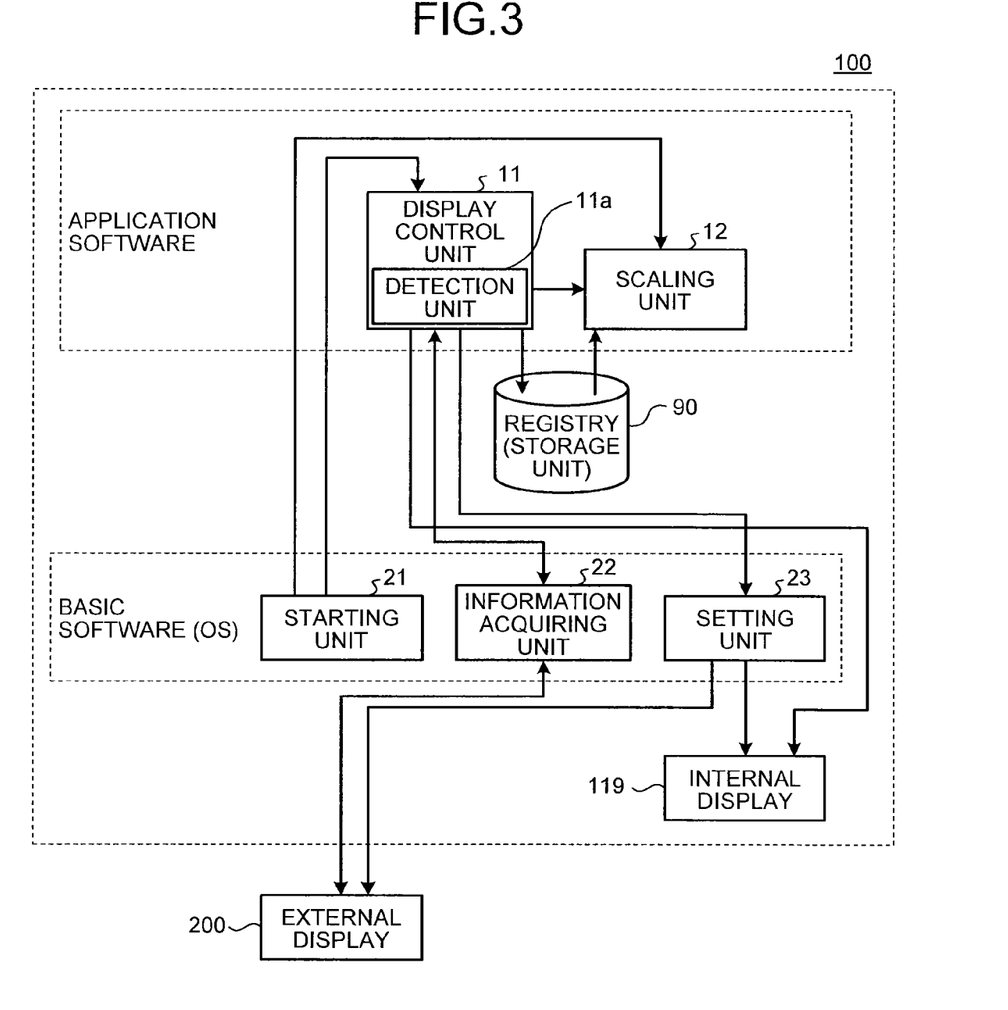
FIG. 3 is a diagram illustrating an exemplary configuration of a display control function according to the first embodiment.

The configuration and operations of the display control function according to the embodiment will be described below. FIG. 3 illustrates an exemplary configuration of the display control function according to the embodiment. As illustrated in FIG. 3, the display control function according to the embodiment includes a display control unit 11, a scaling unit 12, a starting unit 21, an information acquiring unit 22, and a setting unit 23. It is noted that, in the embodiment, the functions of the display control unit 11 and the scaling unit 12 are achieved by, for example, application software, such as a program, installed in the information processing apparatus 100. It is further noted that, in the embodiment, the function of the display control unit 11 is achieved by software including the detection module and the function of the scaling unit 12 is achieved by software including the UI module. Thus, in the embodiment, the functions of the display control unit 11 and the scaling unit 12 are achieved by the modules different from each other. In addition, in the embodiment, the functions of the starting unit 21, the information acquiring unit 22, and the setting unit 23 are achieved by, for example, basic software, such as an operating system (OS), installed in the information processing apparatus 100. Specifically, the display control function according to the embodiment is achieved through cooperation between the basic software and the application software operating on the basic software.

The display control unit 11 controls the display screen according to the screen specifications of the display corresponding to the display destination based on a change in status of the information processing apparatus 100 during or after the starting. The display control unit 11 requests the information acquiring unit 22 to inquire about a device status of the external display 200 and receives a device status response (receives status information of the external display 200). The display control unit 11 changes over the display destination between the internal display 119 and the external display 200 based on the received device status response.

The display control unit 11 includes a detection unit 11a that detects the change in status of the information processing apparatus 100 using the above method of receiving a status response. The detection unit 11a (that corresponds to the detection module) detects the change in status of the information processing apparatus 100 during and after the starting. Changes in status to be detected include a status change of the external display 200, either connected or disconnected. Specifically, the changes in status to be detected include a status change when the external display 200 becomes connected to the information processing apparatus 100 and a status change when the external display 200 becomes detached (disconnected) from the information processing apparatus 100. The basic software detects the change in status of the information processing apparatus 100 based on, for example, a signal input thereto via the external display IF 118 (an input signal from the external display 200). As a result, the basic software gives an event notification for the detection result to the detection unit 11a. Possible notification methods employed at this time include using an event function of the basic software and using an enhanced event function for a uniquely defined event. Receiving the notification, the detection unit 11a detects the change in status of the information processing apparatus 100. This allows the application software to detect the change in status of the information processing apparatus 100, including whether the external display 200 has become connected or disconnected.

The embodiment assumes, as a situation in which the change in status of the information processing apparatus 100 during starting occurs, an exemplary case in which the information processing apparatus 100 to which the external display 200 is connected is started. This is, however, not the only possible situation assumed with the information processing apparatus 100 according to the embodiment. The information processing apparatus 100 according to the embodiment can even handle a change in status as described in the following through cooperative operations between the basic software and the detection unit 11a. For example, situations in which the change in status after starting occurs and that the information processing apparatus 100 can handle include a case in which the information processing apparatus 100 to which the external display 200 is yet to be connected is started and then the external display 200 is connected to the information processing apparatus 100 and a case in which the external display 200 is disconnected after the information processing apparatus 100 has been started.

If the external display 200 is in a state where it can perform display, the display control unit 11 turns off the internal display 119 and instructs the scaling unit 12 (that corresponds to the UI module) to scale the display image according to the screen specifications of the external display 200. The display control unit 11, for example, instructs the internal display 119 to turn off through an application program interface (API) for display drive control of the basic software (by calling an API function). Next, the display control unit 11 writes a value that indicates the device status received in the device status response (hereinafter referred to as "device status information") in a registry 90 (storage unit) (updates a default value of the device status information stored in the registry), thereby storing the device status of the external display 200. It is here noted that the registry refers to an information database (DB) used by the basic software, corresponding to a predetermined storage space of a storage included in the information processing apparatus 100. Additionally, the value that indicates the device status of the internal display 119 is set as the default value of the device status information stored in the registry 90. On completing writing the device status information (completing storing the information), the display control unit 11 thereafter issues an event notifying the completion of writing (storage completion event). The display control unit 11 notifies the scaling unit 12 that writing of the device status of the external display 200 is completed by notifying the issued event. The scaling unit 12, having received the notification, scales the display image based on the device status information of the external display 200 stored in the registry 90 to thereby generate a display screen corresponding to the external display 200.

Methods for notifying the writing completion event include, for example, assigning the writing completion event to a predetermined keyboard event. Additionally, the method for notifying the completion of writing may be a registry notification. A possible method for this case is, for example, setting a value indicating the writing completion notification as a predetermined registry value. The display control unit 11 sends a writing completion notification to the scaling unit 12 through the foregoing method via an event or registry notification API of the basic software.

If the external display 200 is in a state where it can perform display, the display control unit 11 requests the information acquiring unit 22 to inquire about device performance of the external display 200 and receives a device performance response (receives performance information of the external display 200). Based on the received device performance response, the display control unit 11 instructs the setting unit 23 to set resolution in compliance with the screen specifications of the external display 200. The display control unit 11 passes the value of the resolution included in the received device performance response to the setting unit 23, thereby directing the setting of the resolution. Meanwhile, if the external display 200 is not in a state where it can perform display, the display control unit 11 directs the setting of resolution in compliance with the screen specifications of the internal display 119.

The scaling unit 12 scales the display image according to the screen specifications of the display corresponding to the display destination. When, for example, the conference service as described with reference to FIG. 1 is to be provided, the following countermeasure needs to be made. To clarify the countermeasure, a specific situation in which the conference service is used will first be described.

In conference service, an identical image is displayed on an information processing apparatus 100 at a local site and an information processing apparatus 100 at a remote site. At this time, for example, the information processing apparatus 100 at the local site transmits image data of conference material saved therein to the information processing apparatus 100 at the remote site. This results in the same image being displayed on the information processing apparatus 100 at the local site and the information processing apparatus 100 at the remote site.

This enables the image of the same conference material to be viewed at the local site and the remote site, thus achieving smooth communication. It is noted that the local site corresponds to a place at which oneself is present and the remote site corresponds to a place at which a remote attendee is present, the local conference site being different from the remote conference site.

In such a use situation, the image data is generally generated according to a predetermined format (e.g., "size" and "resolution") common to both the information processing apparatus 100 at the local site and the information processing apparatus 100 at the remote site. While transmitting the image data to the information processing apparatus 100 at the remote site on one hand, the information processing apparatus 100 at the local site needs, on the other, to scale the same image data as that transmitted to the remote site to an appropriate size according to the display screen at the local site before the same image can be displayed on the information processing apparatus 100 at the local site. In conference service use situations, preferably, the information processing apparatus 100 can support such a requirement in order to provide an environment that achieves smooth communication. Thus, the information processing apparatus 100 according to the embodiment includes the scaling unit 12 that supports the above-described requirement.

The scaling unit 12 refers to the registry 90 and reads (acquires) the device status information of the display destination. Based on the read device status information, the scaling unit 12 identifies the display destination after the changeover and performs a scaling process on the display image to make the display image correspond to the identified display destination. The scaling unit 12, on receipt of the writing completion event notification from the display control unit 11, reads the device status of the external display 200 stored in the registry 90 and identifies the external display 200 as the display destination. It is noted that, before receiving the writing completion event notification from the display control unit 11, the scaling unit 12 refers to the default value of the device status information stored in the registry 90 and sets the internal display 119 as the display destination.

Having identified the display destination after the changeover, the scaling unit 12 performs the scaling process for the display screen corresponding to the display destination through the method described below. The scaling unit 12 first identifies a display area before the changeover (a vertical length H1, a horizontal length W1) and a display area after the changeover (a vertical length H2, a horizontal length W2) based on predetermined specifications of display areas for different types of displays. Then, based on size ratios of the identified display area (a vertical length ratio H2/H1, a horizontal length ratio W2/W1), the scaling unit 12 obtains a magnification (an enlarging ratio or a reducing ratio) of the display image.

The scaling unit 12 may store display image magnifications previously obtained for each of possible different display destination changeover patterns based on the screen specifications of each of the internal display 119 of the information processing apparatus 100 and the external display 200 to be connected to the information processing apparatus 100. For example, let '1' be the magnification of the external display 200; then, the magnification corresponding to the internal display 119 having a display area smaller than that of the external display 200 is set to be '0.85' and the magnification values of '1' and '0.85' may be stored. If the magnifications are stored in this way, the scaling unit 12 identifies the display destination changeover pattern (either a changeover from the internal display 119 to the external display 200 or a changeover from the external display 200 to the internal display 119). As a result, the scaling unit 12 acquires, based on the identification result, a specific magnification corresponding to the display destination changeover pattern selected from among the stored magnifications. This allows the scaling unit 12 to scale the display image, even if the display control unit 11 is unable to acquire the device information including the screen specifications from the external display 200 via the information acquiring unit 22.

Then, the scaling unit 12 scales the display image before the changeover based on the obtained magnification or the acquired magnification. At this time, the scaling unit 12 achieves this task by generating display data in compliance with a predetermined data format capable of being processed by the UI function (a display screen drawing function) of the display corresponding to the display destination. The scaling unit 12 generates display data for scaling the display image according to the data format capable of being processed by the UI function of the display destination. Languages of the data format as used here include, for example, HyperText Markup Language (HTML)/Cascading Style Sheets (CSS). In accordance with the language specifications of the data format, the scaling unit 12 generates the display data in which image data of the display image (display image data) is embedded and the magnification value is set as a parameter value for the image scaling process. If the language of the data format is HTML, the image data is embedded using a definition tag, such as an image tag. The parameter value for the image scaling process may be set by setting the value of an enlarging ratio or a reducing ratio in an attribute value, such as transform:scale( ). As a result, at the display corresponding to the display destination, the display data is processed by the UI function implemented therein and the display screen is drawn based on the processing result on the display. This results in the display image being displayed on the display screen while being enlarged or reduced at the set magnification.

The above-described display image includes, for example, image data generated by the information processing apparatus 100 and previously stored image data. The display image further includes image data received from another information processing apparatus 100 via the communication IF 112 and image data received from an external device connected via the external device IF 121.

In conference service use situations, the information processing apparatus 100 at the local site first generates image data of the display image according to the predetermined format. The information processing apparatus 100 at the local site next functions as a transmitting unit and transmits the generated image data to the information processing apparatus 100 at the remote site. At this time, the scaling unit 12 of the information processing apparatus 100 at the local site performs a scaling process for displaying the same image on the information processing apparatus 100 at the local site after or before the image data is transmitted. At this time, the scaling unit 12 scales the display image with contents identical to those of the image data to be transmitted to thereby change the size (image size).

In this way, the embodiment stores the detected connection status of the external display 200 and, according to a storage completion notification, confirms the stored connection status; then, based on the confirmation result, the embodiment controls the changeover of the display screen corresponding to the display destination. This enables the embodiment to change over the display destination appropriately based on the detection result of the external display 200 regardless of the order in which starting of the different modules is completed. That is, the embodiment is free from the problem that the UI module fails to receive an event notified during its starting during which the UI module is unable to receive events. Thus, the embodiment is also free from the problem that the display screen corresponding to the external display 200 to which changeover is to be performed is not generated, and the display destination is not changed over to the external display 200. As a result, the information processing apparatus 100 according to the embodiment can change over the display destination appropriately even during the starting of the display control function.

In addition, the embodiment uses a common UI function between the internal display 119 and the external display 200 to scale the display image, eliminating the need for individual handling (generating the display data individually). Specifically, in the embodiment, the internal display 119 and the external display 200 use the common display data to scale the display image. This simplifies the scaling process and reduces processing load.

The starting unit 21 starts the application software (a group of modules that achieve different functions) that provides the display control function. The starting unit 21, for example, requests a computer program (corresponding to an individual module) that achieves the function of the display control unit 11 or a computer program that achieves the function of the scaling unit 12 to start, and the computer program is thus executed.

The information acquiring unit 22 acquires various types of information from the external display 200 according to the request made from the display control unit 11. The information acquiring unit 22 sends a query about the device status to the external display 200 via the external display IF 118 and acquires, for example, status information that indicates a displayable status or an non-displayable status. The information acquiring unit 22 also sends a query about the device performance to the external display 200 via the external display IF 118 and acquires performance information including, for example, resolution. Examples of the performance information acquired at this time include general-purpose data that represents hardware performance retained in advance by the display for connection to various types of devices. The information acquiring unit 22 passes the acquired information to the display control unit 11 that made the request.

The following briefly describes the abovementioned general-purpose data as an example of the performance information acquired by the information acquiring unit 22. Displays achieve a plug-and-play feature (automatic detection and automatic connection) with the device to which they are connected. To connect a PC and a display, it is generally required that a video signal output from the PC be brought to fall within ranges of frequency and resolution supported by the display. The frequency includes horizontal and vertical scanning frequencies and a clock frequency of the video signal. The resolution means hardware performance of the configuration of dots in the horizontal and vertical directions. To achieve the plug-and-play feature, the PC needs to acquire these types of information from the display using some suitable means. Extended display identification data (EDID) is available for use as the general-purpose data enabling the connection with various types of devices. The EDID represents 128-byte binary data that describes characteristics unique to the display, such as the frequency and resolution supported by the display, and the name of manufacturer (vendor ID) and the model (product ID) of the display. The EDID is retained in a storage of the display. The EDID may include an extended block with a size of more than 128 bytes.

In response to a request from the display control unit 11, the setting unit 23 sets the resolution for the display corresponding to the display destination. At this time, the setting unit 23 sets the resolution for the external display 200 based on the value of the resolution received from the display control unit 11. Meanwhile, the setting unit 23 sets the resolution for the internal display 119 based on the value of the resolution stored in advance.

As described heretofore, the display control function according to the embodiment is achieved by implementation of the software. Specifically, the display control function is achieved by executing an information processing program that achieves the display control function and cooperatively operating the above-described functional units in the information processing apparatus 100.

The information processing program is stored and provided as an installable or executable file in the storage medium 106 that can be read by the information processing apparatus 100 (computer) in which the information processing program is executed. The information processing program has a modular configuration including the above-described functional units. Each functional unit is generated on the RAM 103 as a result of the CPU 101 loading the program from the storage medium 106 and executing the loaded program. The information processing program may even be provided otherwise. Specifically, for example, the information processing program may be stored in a device connected to a network such as the Internet and provided by being downloaded via the communication IF 112 over the network. Specifically, in the information processing system 1000 according to the embodiment, the information processing apparatus 100 transmits an information processing program request to the computer program providing apparatus 300 to thereby download and install the information processing program from the computer program providing apparatus 300. If the information processing program is updated after it has been installed, the updated information processing program is downloaded as follows. For example, the computer program providing apparatus 300 may notify the information processing apparatus 100 that the information processing program has been updated. This causes the information processing apparatus 100 to download and install the updated information processing program from the computer program providing apparatus 300. Downloading of the updated information processing program may be the downloading of the program itself or differential elements that constitute the program, such as a library. The information processing program may still be embedded in advance and provided in the ROM 102 or the flash memory 104, for example.

The following describes processing performed when the information processing program according to the embodiment is executed (cooperative operations of the functional units) using sequence diagrams and flowcharts. For convenience sake, the following description assumes an exemplary use situation in which the external display 200 is connected in advance and the information processing apparatus 100 is turned on. In addition, the following description assumes that the display control unit 11 and the scaling unit 12 are the functions achieved by modules to be started by the starting unit 21. Additionally, the description will be given in two different patterns in terms of a difference in time until the completion of starting (hereinafter referred to as "starting time") between the modules to be started. Specifically, in a first pattern, starting time A of the detection module is shorter than starting time B of the UI module. It is here noted that the detection module as used here is one of the modules that achieves the function of the display control unit 11 that detects the connection of the external display 200. Thus, in the following, the starting time A of the detection module will be referred, for convenience sake, to as the starting time A of the display control unit 11. Similarly, the UI module is one of the modules that achieves the function of the scaling unit 12 that generates the display screen corresponding to the external display 200. Thus, in the following, the starting time B of the UI module will be referred, for convenience sake, to as the starting time B of the scaling unit 12. Specifically, the scaling unit 12 takes longer time to complete starting than the display control unit 11 does. In a second pattern, the starting time of the display control unit 11 is longer than the starting time of the scaling unit 12. Specifically, the scaling unit 12 takes shorter time to complete starting than the display control unit 11 does.

Processing performed when the starting time A of the display control unit 11 is shorter than the starting time B of the scaling unit 12

Figure 4:
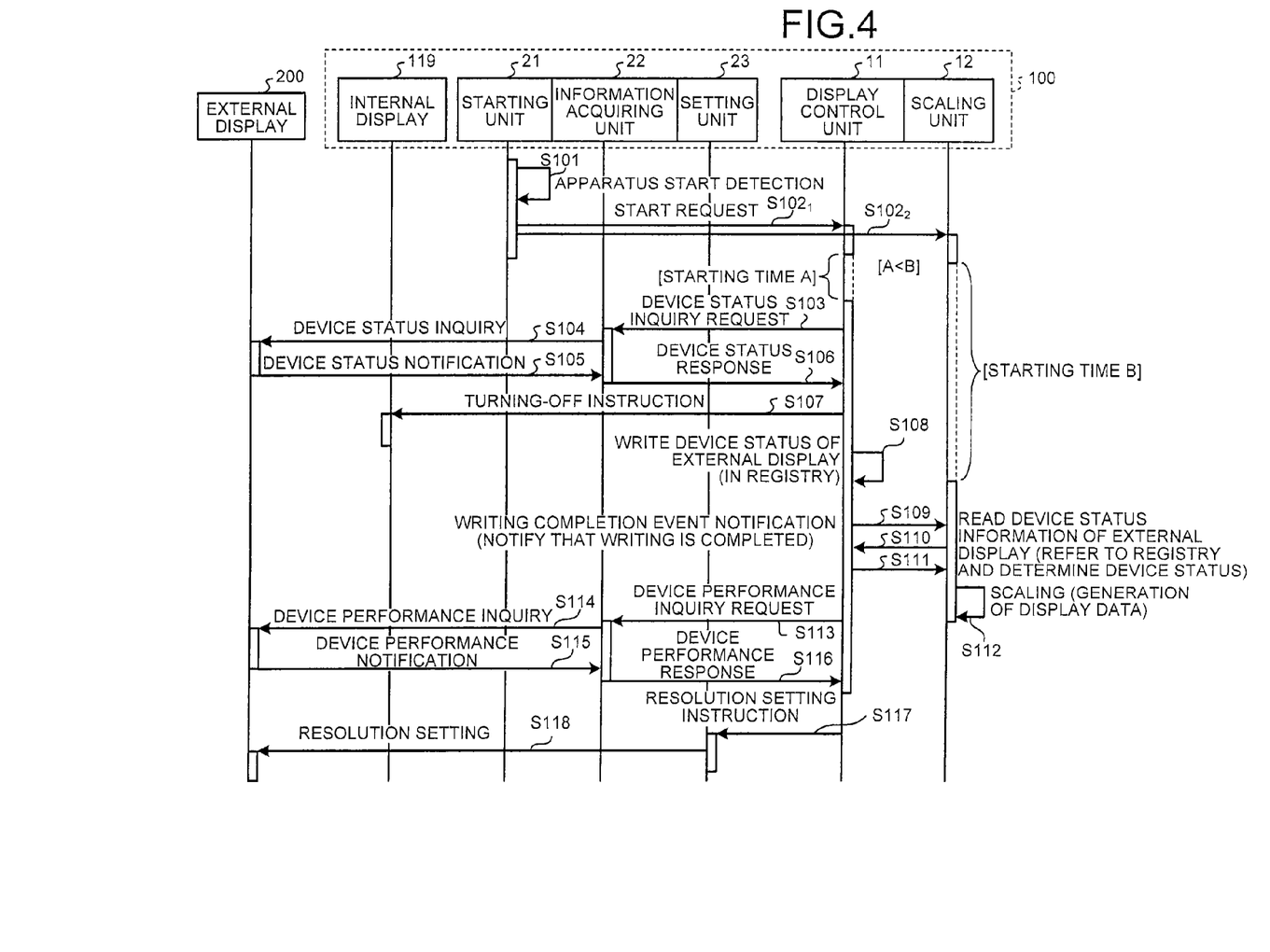
FIG. 4 is a sequence diagram illustrating exemplary processing procedure (part 1) at the time of display control according to the first embodiment.

FIG. 4 is a sequence diagram illustrating exemplary processing procedure (part 1) at the time of the display control according to the embodiment. As illustrated in FIG. 4, when the information processing apparatus 100 according to the embodiment is turned on, the starting unit 21 detects that the information processing apparatus 100 has been turned on (step S101) and requests the display control unit 11 and the scaling unit 12 to start (steps $S102_1$, $S102_2$). It is noted that the exemplary processing procedure illustrates a case in which the starting unit 21 starts the functional units simultaneously.

Upon receipt of the requests, the display control unit 11 and the scaling unit 12 each start. Assume that the display control unit 11 thereafter completes starting earlier than the scaling unit 12 ([A<B]).

The display control unit 11 that has completed starting earlier requests the information acquiring unit 22 to inquire about the device status of the external display 200 (step S103). The information acquiring unit 22 sends a query about the device status to the external display 200 via the external display IF 118 (step S104) and receives the device status notification from the external display 200 (step S105). Thereby, the information acquiring unit 22 acquires the status information that indicates the connection status of the external display 200. Based on the acquired status information, the information acquiring unit 22 responds to the display control unit 11 that made the request, regarding the device status of the external display 200 (step S106).

Then, based on the device status response, the display control unit 11 changes over the display destination between the internal display 119 and the external display 200.

Specifically, the display control unit 11, having determined from the received device status response that the external display 200 is in a state where it can perform display, instructs the internal display 119 to turn off its display screen (step S107). Next, the display control unit 11 accesses the registry 90 and writes the device status of the external display 200 based on the device status response (step S108). The display control unit 11 thereby stores the device status of the external display 200 detected during the starting of the apparatus in the registry 90, thus updating the default value of the device status information. Then, on completing writing the device status in the registry 90, the display control unit 11 sends notification of a writing completion event to thereby notify the scaling unit 12 that the writing of the device status of the external display 200 is completed (step S109).

On receipt of the writing completion event notification, the scaling unit 12 that has completed starting later than the display control unit 11 reads the device status information of the external display 200 from the registry 90 (steps S110, S111). Specifically, the scaling unit 12 refers to the registry 90 and determines the device status according to the writing completion event notification. The scaling unit 12 thereby identifies, based on the read device status information, the external display 200 as the display destination after the changeover and performs the following scaling process.

FIG. 4 illustrates that the scaling unit 12 has completed starting at a point in time that the scaling unit 12 is notified of the writing completion event notification at step S109; however, it is possible that the scaling unit 12 is yet to complete starting at that point in time. In such a case, the scaling unit 12, because it is yet to complete starting, is unable to receive the writing completion event notification at step S109. After completing starting, however, the scaling unit 12 reads the device status information of the external display 200 from the registry 90 on its own initiative (steps S110, S111). Specifically, the scaling unit 12 can refer to the registry 90 and determine the device status after the completion of starting without having to receive the writing completion event notification.

Based on the magnification obtained from the vertical length ratio and the horizontal length ratio of the display area of the internal display 119 and the display area of the external display 200, the scaling unit 12 generates display data for scaling the display image displayed on the internal display 119 (step S112). At this time, the scaling unit 12 generates the display data in which image data of the display image is embedded and the magnification value is set as the parameter value for the image scaling process in accordance with the specifications of the language that can be processed by the UI function of the external display 200. Specifically, the scaling unit 12 generates the display data in which the value of an enlarging ratio is set as the parameter value for the image scaling process. Thereby, the scaling unit 12 enlarges the display image in accordance with the display area of the external display 200.

The display control unit 11, when having determined that the external display 200 is in a state where it can perform display, requests the information acquiring unit 22 to inquire about the device performance of the external display 200 (step S113). The information acquiring unit 22 sends a query about the device performance to the external display 200 via the external display IF 118 (step S114) and receives a device performance notification from the external display 200 (step S115). The information acquiring unit 22 thereby acquires performance information from the external display 200. Based on the acquired performance information, the information acquiring unit 22 responds to the display control unit 11 that made the request, regarding the device performance of the external display 200 (step S116).

Having received the device performance response, the display control unit 11 instructs the setting unit 23 to set resolution in accordance with the screen specifications of the external display 200 based on the value of resolution included in the device performance response (step S117). The setting unit 23 sets the resolution for the external display 200 based on the value of resolution received from the display control unit 11 (step S118). In setting the resolution, the setting unit 23 sets the resolution based on the value of resolution included in the EDID of the external display 200.

As a result, in the external display 200 selected as the display destination, the UI function interprets the display data and draws the scaled (enlarged) display image on the display screen.

As described heretofore, in the display control function according to the embodiment, even when the scaling unit 12 takes longer time to complete starting than the display control unit 11 does, the display destination is properly changed over based on the detection result of the external display 200.

Processing performed when the starting time A of the display control unit 11 is longer than the starting time B of the scaling unit 12

Figure 5:
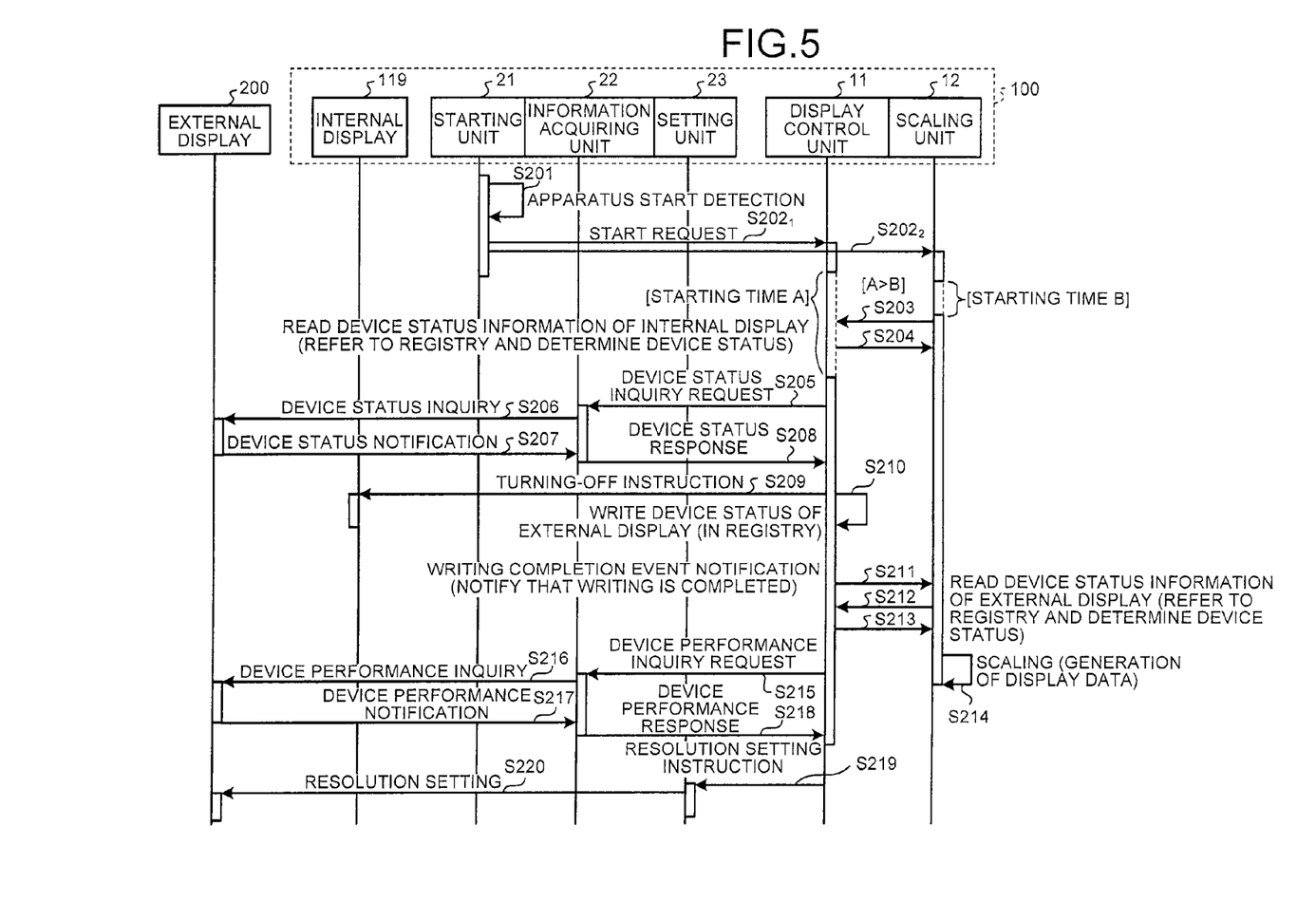
FIG. 5 is a sequence diagram illustrating exemplary processing procedure (part 2) at the time of the display control according to the first embodiment.

FIG. 5 is a sequence diagram illustrating exemplary processing procedure (part 2) at the time of the display control according to the embodiment. As illustrated in FIG. 5, when the information processing apparatus 100 according to the embodiment is turned on, the starting unit 21 detects that the information processing apparatus 100 has been turned on (step S201) and requests the display control unit 11 and the scaling unit 12 to start (steps S202$_1$, S202$_2$). It is noted that the exemplary processing procedure illustrates a case in which the starting unit 21 starts the functional units simultaneously.

Upon receipt of the requests, the display control unit 11 and the scaling unit 12 each start. Assume that the display control unit 11 thereafter completes starting later than the scaling unit 12 ([A>B]).

The scaling unit 12 that has completed starting earlier reads the device status information of the internal display 119 from the registry 90 (steps S203, S204). The exemplary processing procedure illustrates that the display control unit 11 is still in the process of starting at this time, so that the device status information of the registry 90 is yet to be updated and is a default value. Thus, at this point in time, the scaling unit 12 reads the device status information of the internal display 119 stored as a default value in the registry 90.

The display control unit 11 that has completed starting later than the scaling unit 12 requests the information acquiring unit 22 to inquire about the device status of the external display 200 (step S205). The information acquiring unit 22 sends a query about the device status to the external display 200 via the external display IF 118 (step S206) and receives a device status notification from the external display 200 (step S207). The information acquiring unit 22 thereby acquires the status information that indicates the connection status of the external display 200. Based on the acquired status information, the information acquiring unit 22 responds to the display control unit 11 that made the request, regarding the device status of the external display 200 (step S208).

Then, based on the device status response, the display control unit 11 changes over the display destination between the internal display 119 and the external display 200.

Specifically, the display control unit 11, having determined from the received device status response that the external display 200 is in a state where it can perform display, instructs the internal display 119 to turn off its display screen (step S209). Next, the display control unit 11 accesses the registry 90 and writes the device status of the external display 200 based on the device status response (step S210). The display control unit 11 thereby stores the device status of the external display 200 detected during the starting of the apparatus in the registry 90, thus updating the default value of the device status information. Then, on completing writing the device status in the registry 90, the display control unit 11 sends notification of a writing completion event to thereby notify the scaling unit 12 that the writing of the device status of the external display 200 is completed (step S211).

The scaling unit 12, on receipt of the writing completion event notification, reads the device status information of the external display 200 from the registry 90 (steps S212, S213). Specifically, the scaling unit 12 refers to the registry 90 and determines the updated device status according to the writing completion event notification. The scaling unit 12 thereby identifies the external display 200 as the display destination after the changeover based on the read device status information and performs the following scaling process.

Based on the magnification obtained from the vertical length ratio and the horizontal length ratio of the display area of the internal display 119 and the display area of the external display 200, the scaling unit 12 generates display data for scaling the display image displayed on the internal display 119 (step S214). At this time, the scaling unit 12 generates the display data in which image data of the display image is embedded and the magnification value is set as the parameter value for the image scaling process in accordance with the specifications of the language that can be processed by the UI function of the external display 200. Specifically, the scaling unit 12 generates the display data in which the value of an enlarging ratio is set as the parameter value for the image scaling process. Thereby, the scaling unit 12 enlarges the display image in accordance with the display area of the external display 200.

The display control unit 11, when having determined that the external display 200 is in a state where it can perform display, requests the information acquiring unit 22 to inquire about the device performance of the external display 200 (step S215). The information acquiring unit 22 sends a query about the device performance to the external display 200 via the external display IF 118 (step S216) and receives a device performance notification from the external display 200 (step S217). The information acquiring unit 22 thereby acquires performance information from the external display 200. Based on the acquired performance information, the information acquiring unit 22 responds to the display control unit 11 that made the request, regarding the device performance of the external display 200 (step S218).

Having received the device performance response, the display control unit 11 instructs the setting unit 23 to set resolution in accordance with the screen specifications of the external display 200 based on the value of resolution included in the device performance response (step S219). The setting unit 23 sets the resolution for the external display 200 based on the value of resolution received from the display control unit 11 (step S220). In setting the resolution, the setting unit 23 sets the resolution based on the value of resolution included in the EDID of the external display 200.

As a result, in the external display 200 selected as the display destination, the UI function interprets the display data and draws the scaled (enlarged) display image on the display screen.

As described heretofore, in the display control function according to the embodiment, even when the scaling unit 12 takes shorter time to complete starting than the display control unit 11 does, the display destination is properly changed over based on the detection result of the external display 200.

In addition, in the display control function according to the embodiment, the image displayed on the internal display 119 before the changeover is scaled (enlarged) to fit the size of the display area of the external display 200 after the changeover and displayed at an appropriate resolution.

Detailed processing when detecting the external display 200

Figure 6:
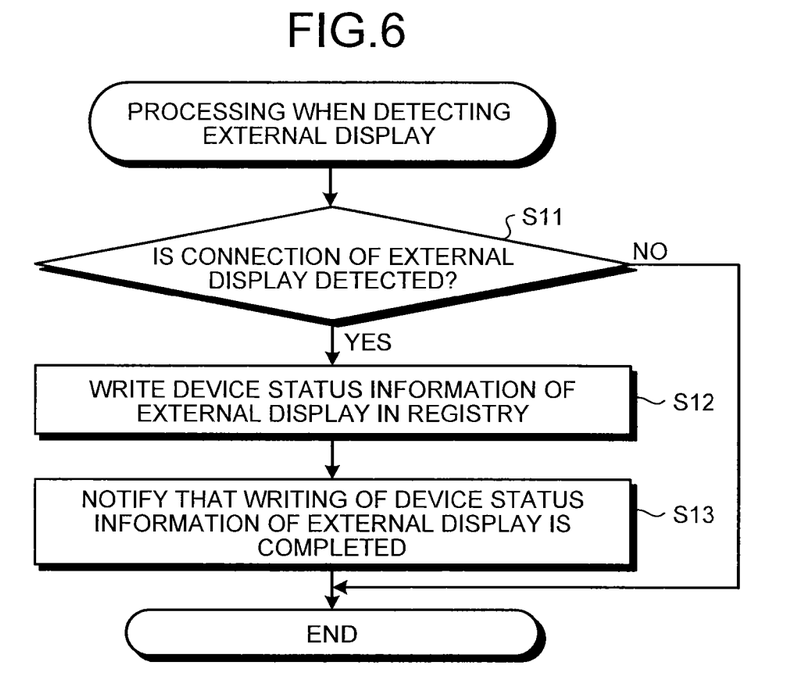
FIG. 6 is a flowchart illustrating exemplary processing procedure when detecting an external display according to the first embodiment.

FIG. 6 is a flowchart illustrating exemplary processing procedure when detecting the external display 200 according to the embodiment. FIG. 6 illustrates exemplary detailed processing procedure performed for writing the device status information and sending notification of the writing completion event performed after the external display 200 has been detected. The exemplary processing is performed by the display control unit 11.

As illustrated in FIG. 6, the display control unit 11 according to the embodiment uses the detection unit 11a to determine whether the connection of the external display 200 is detected (step S11).

The display control unit 11, when having determined that the connection of the external display 200 is detected (Yes at step S11), writes the detected device status information of the external display 200 in the registry 90 (step S12). At this time, the display control unit 11 writes the device status information based on the status response from the detected external display 200 in the registry 90. Thereby, the display control unit 11 rewrites the default value of the device status information in the registry 90 (device status information of the internal display 119) with the device status information of the external display 200, thus updating the default value of the device status information.

On completing writing the device status information in the registry 90, the display control unit 11 notifies that the writing of the device status information of the detected external display 200 is completed (step S13). At this time, the display control unit 11 notifies the scaling unit 12 of the writing completion event.

If it has determined that the connection of the external display 200 is not detected (No at step S11), the display control unit 11 skips the processing of steps S12 and S13.

Detailed Processing at the Time of Scaling

Figure 7:
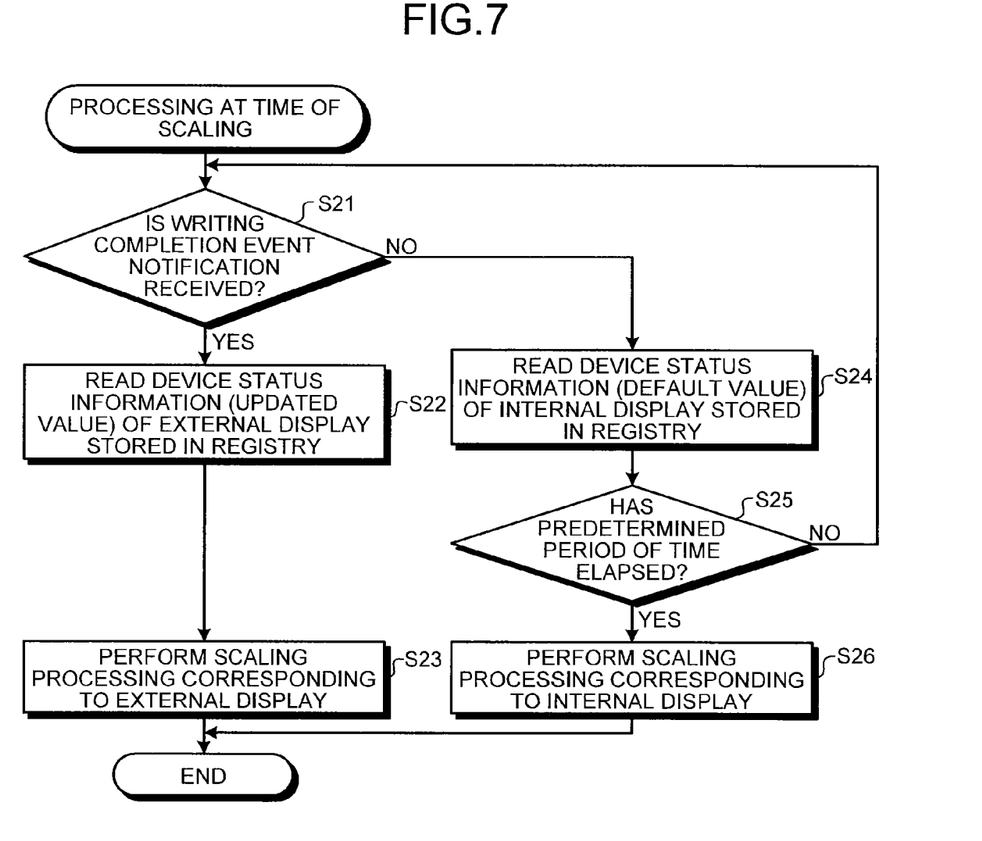
FIG. 7 is a flowchart illustrating exemplary processing procedure at the time of scaling according to the first embodiment.

FIG. 7 is a flowchart illustrating exemplary processing procedure at the time of scaling according to the first embodiment. FIG. 7 illustrates detailed scaling processing performed after the writing of the device status information of the external display 200 is completed. The exemplary processing is performed by the scaling unit 12.

As illustrated in FIG. 7, the scaling unit 12 according to the embodiment determines whether a notification of the writing completion event indicating that the writing of the device status information in the registry 90 is completed is received (S21).

The scaling unit 12, when having determined that the writing completion event notification has been received (Yes at step S21), refers to the registry 90 and reads the device status information (updated value) of the external display 200 stored in the registry 90 (step S22).

Next, the scaling unit 12 performs the scaling processing corresponding to the external display 200 based on the read device status information (updated value) (step S23). At this time, the scaling unit 12 identifies the external display 200 as the display destination after the changeover based on the read device status information and performs the scaling processing for the display image to make the display image correspond to the identified external display 200.

If it has determined that the writing completion event notification is yet to be received (No at step S21), the scaling unit 12 refers to the registry 90 and reads the device status information of the internal display 119 (default value) stored in the registry 90 (step S24).

Next, the scaling unit 12 determines whether a predetermined period of time elapses after the device status information has been read (step S25). This determining step assumes the following situation and is intended to select the internal display 119 as the display destination. For example, if the external display 200 that is preferentially selected as the display destination is not detected for some reason (including a situation in which the external display 200 cannot perform display) and if the writing completion event notification is not received within the predetermined period of time, the internal display 119 is selected as the display destination. The predetermined period of time represents a period of time required for performing this determining step (until the writing completion event is received) and may be set in advance in the information processing apparatus 100.

Thus, as long as the scaling unit 12 determines that the predetermined period of time is yet to elapse after the device status information has been read (No at step S25), the scaling unit 12 goes back to the step of step S21 and comes to a state of waiting for the writing completion event notification to be received.

When having determined that the predetermined period of time elapses after the device status information has been read (Yes at step S25), the scaling unit 12 performs the scaling processing corresponding to the internal display 119 based on the read device status information (default value) (step S26). At this time, the scaling unit 12 identifies the internal display 119 as the display destination after the changeover based on the read device status information and performs the scaling processing for the display image to make the display image correspond to the identified internal display 119.

OVERVIEW

As described above, the information processing apparatus 100 according to the embodiment detects the connection status of the external display 200. Based on the detected connection status, the information processing apparatus 100 changes over the display destination between the internal display 119 and the external display 200 and controls the display screen according to the screen specifications of the display corresponding to the display destination after the changeover. At this time, in the information processing apparatus 100, the detection module stores the detected connection status of the external display 200 and notifies the UI module that writing is completed. When the UI module receives the notification of the completion of writing, the information processing apparatus 100 acquires the connection status of the stored external display 200; and, based on the acquired information, scales the display image and sets resolution corresponding to the external display 200.

The information processing apparatus 100 according to the embodiment thereby provide an environment in which the display destination is changed over properly based on the result of detection of the external display 200, regardless of the order in which the modules start. As a result, the information processing apparatus 100 according to the embodiment can properly change over the display destination even during starting of the display control function.

The embodiment has been described for a case in which the device status information is stored in the registry 90. This is, however, not the only possible arrangement. The area in which the device status information is stored may be any predetermined area as long as the area can be accessed by the detection module (the display control unit 11) that writes the information and the UI module (the scaling unit 12) that reads the information.

The embodiment has been described for a case in which the display control is performed for the display devices. This is, however, not the only possible arrangement. The display control may be performed for, for example, a PC, a smartphone, a tablet terminal, or a portable telephone. Specifically, the display control may be performed for any device as long as it can be connected to the information processing apparatus 100 and has a display.

The embodiment has been described for a case in which the functions of the information processing apparatus 100 are achieved by the software implemented therein. This is, however, not the only possible arrangement. For example, part or all of the functional units of the information processing apparatus 100 may even be achieved by hardware mounted therein.

In addition, the embodiment has been described for a case in which the conference material saved in the information processing apparatus 100 is displayed on the internal display 119 or the external display 200 in the conference service. This is, however, not the only possible arrangement. For example, an external device may be connected to the information processing apparatus 100 and the conference material may be displayed on the internal display 119 or the external display 200 from the external device, the information processing apparatus 100 receives display data for displaying reference data.

The embodiment provides an advantageous effect of enabling a proper changeover of the display even during starting of the display control function.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable medium having a computer program recorded thereon, the computer program configured to perform a method when executed on a computer, the method comprising:
   detecting a connection status of an externally connectable second display different from a first display;
   sending a notification of completion of writing after status information indicating the detected connection status is written in storage;
   changing over a display destination between the first display and the second display based on the detected connection status after receipt of the notification of the completion of the writing;
   reading, when a scaling process has completed starting, the connection status written in the storage upon receipt of notification of the completion of the writing;
   reading, when the scaling process has not completed starting, the connection status written in the storage after the scaling process completes starting;
   scaling a display image at a magnification based on the read connection status;
   sending a query to the second display inquiring about performance information of the second display; and
   setting a resolution of the second display based on the performance information of the second display,
   wherein the scaling process occurs prior to the writing of the detected connection status.

2. The non-transitory computer-readable medium according to claim 1, wherein
   upon receipt of the notification of the completion of the writing, the status information is read from the storage, the second display is identified as the display destination after the changeover based on the read status information, the magnification is obtained according to a display screen corresponding to the identified second display, and the display image is scaled at the obtained magnification at the reading and scaling.

3. The non-transitory computer-readable medium according to claim 1, wherein
   when the notification of the completion of the writing is not received within a predetermined period of time, the status information of the first display stored as a default value is read from the storage, the first display is identified as the display destination after the changeover based on the read status information, the magnification is obtained according to a display screen corresponding to the identified first display, and the display image is scaled at the obtained magnification at the reading and scaling.

4. An information processing method comprising:
  detecting a connection status of an externally connectable second display different from a first display;
  sending a notification of completion of writing after status information indicating the detected connection status is written in storage;
  changing over a display destination between the first display and the second display based on the detected connection status after receipt of the notification of the completion of the writing;
  reading, when a scaling process has completed starting, the connection status written in the storage upon receipt of notification of the completion of the writing;
  reading, when the scaling process has not completed starting, the connection status written in the storage after the scaling process completes starting;
  scaling, via processing circuitry, a display image at a magnification based on the read connection status;
  sending a query to the second display inquiring about performance information of the second display; and
  setting a resolution of the second display based on the performance information of the second display,
  wherein the scaling process occurs prior to the writing of the detected connection status.

5. An information processing apparatus comprising:
  circuitry configured to:
  detect a connection status of an externally connectable second display different from a first display;
  send a notification of completion of writing after status information indicating the detected connection status is written in storage;
  change over a display destination between the first display and the second display based on the detected connection status after receipt of the notification of the completion of the written status information,
  read, when a scaling process has completed starting, the connection status written in the storage upon receipt of notification of the completion of the writing;
  read, when the scaling process has not completed starting, the connection status written in the storage after the scaling process completes starting;
  scale a display image at a magnification based on the read connection status,
  send a query to the second display inquiring about performance information of the second display; and
  set a resolution of the second display based on the performance information of the second display,
  wherein the scaling process occurs prior to the writing of the detected connection status.

6. The information processing apparatus according to claim 5, wherein the circuitry is further configured to:
  upon receipt of the notification of the completion of written status information, read the status information from the storage, identify the second display as the display destination after the changeover based on the read status information, obtain the magnification according to a display screen corresponding to the identified second display, and scale the display image at the obtained magnification.

7. The information processing apparatus according to claim 5, wherein the circuitry is further configured to:
  when the notification of the completion of writing is not received within a predetermined period of time, read the status information of the first display stored as a default value from the storage, identify the first display as the display destination after the changeover based on the read status information, obtain the magnification according to a display screen corresponding to the identified first display, and scale the display image at the obtained magnification.

8. The non-transitory computer-readable medium according to claim 1, wherein the method further includes:
  turning off a display of the first display during the changeover.

9. The non-transitory computer-readable medium according to claim 1, wherein the storage corresponds to a registry of the computer.

10. The non-transitory computer-readable medium according to claim 1, wherein the first display is disposed in the computer and the second display is directly connected to the computer.

11. The non-transitory computer-readable medium according to claim 1, wherein the method further includes:
  receiving the query regarding the performance information from the second display.

12. The information processing apparatus according to claim 5, wherein a display of the first display is turned off during the changeover.

13. The information processing apparatus according to claim 5, wherein the storage corresponds to a registry of the information processing apparatus.

14. The information processing apparatus according to claim 5, wherein the first display is disposed in the information processing apparatus and the second display is directly connected to the information processing apparatus.

15. The non-transitory computer-readable medium according to claim 1, wherein the method further includes:
  controlling a display screen according to screen specifications of the first display or the second display, which corresponds to the display destination after the changeover.

16. The non-transitory computer-readable medium according to claim 1, wherein the notification of the completion of the writing is a registry notification.

17. The non-transitory computer-readable medium according to claim 1, wherein the method further includes:
  adjusting resolution of the display image based on the performance information.

* * * * *